United States Patent [19]

Kiriyama et al.

[11] Patent Number: 4,969,079
[45] Date of Patent: Nov. 6, 1990

[54] CORRECTIVE DEVICE FOR INVERTER OUTPUT VOLTAGE ERROR

[75] Inventors: Mitsuo Kiriyama; Joji Kawai, both of Kobe, Japan

[73] Assignee: Mitsubishi Denki Kabushiki Kaisha, Japan

[21] Appl. No.: 472,297

[22] Filed: Jan. 30, 1990

[30] Foreign Application Priority Data

Jun. 2, 1989 [JP] Japan .................. 1-140805

[51] Int. Cl.$^5$ ............................................. H02M 1/12
[52] U.S. Cl. ........................................ 363/41; 363/56; 363/80; 363/98; 363/132
[58] Field of Search .................. 363/41, 55, 56, 79, 363/80, 95, 97, 98, 131, 132, 134

[56] References Cited

U.S. PATENT DOCUMENTS

| | | | |
|---|---|---|---|
| 4,133,025 | 1/1979 | Wurzburg | 363/41 |
| 4,546,422 | 10/1985 | Okado | 363/132 |
| 4,562,386 | 12/1985 | Goff et al. | 363/97 |
| 4,600,984 | 7/1986 | Cohen | 363/97 |
| 4,660,137 | 4/1987 | Hotaka | 363/56 |
| 4,692,855 | 9/1987 | Kuroiwa et al. | 363/95 |
| 4,729,082 | 3/1988 | Sato | 363/41 |
| 4,729,084 | 3/1988 | Kataoka | 363/56 |
| 4,791,546 | 12/1988 | Carroll | 363/95 |
| 4,803,611 | 2/1989 | Sashida et al. | 363/98 |

OTHER PUBLICATIONS

Sekino et al, "Inverter Output Voltage Waveform Closed-Loop Control Technique", INTELEC 83, Oct., 1983.

Primary Examiner—Steven L. Stephan
Assistant Examiner—Jeffrey Sterrett
Attorney, Agent, or Firm—Leydig, Voit & Mayer

[57] ABSTRACT

A corrective device for an inverter output voltage error in which a current sensor is connected in series with the output of an inverter, the polarity of current detected by the current sensor is discriminated by a polarity decision current, a value corresponding to an input D.C. voltage is found by a D.C. voltage sensor, a signal with the polarity of the value inverted according to the discriminated result delivered from the polarity decision current is genertaed by a polarity inverter circuit, and the signal is applied as a correction signal to the PWM (pulse-width modulation) circuit of the inverter so as to correct the output voltage error.

1 Claim, 4 Drawing Sheets

CORRECTIVE DEVICE FOR INVERTER OUTPUT VOLTAGE ERROR

BACKGROUND OF THE INVENTION

This invention relates to a corrective device for an inverter output voltage error wherein the error of an inverter output voltage attributed to a short-circuit preventive period is detected and is corrected so as to become smaller.

FIG. 1 is a block connection diagram in which a prior-art inverter control circuit shown in, for example, Collection of Papers of 'Intelec 83' (Oct. 18–21, Tokyo), pp. 205–212, Sekino et al.; Inverter Output Voltage Waveform Closed Loop Control Technique, is redrafted. Referring to the figure, numeral 1 designates an inverter main circuit. Numerals 2 and 3 designate a reactor and a capacitor, respectively, which constitute an A.C. filter. Numeral 4 indicates a D.C. power source, numeral 5 a load, numeral 7 a drive circuit for the inverter main circuit 1, numeral 8 an A.C. reference voltage generator circuit for generating a reference voltage having the shape of a sinusoidal wave, and numeral 9 an amplifier. Shown at numeral 10 is a PWM (pulse-width modulation) circuit, which is configured of a comparator circuit 10a and a carrier wave generator circuit 10b.

In addition, FIG. 2 shows a diagram of the conventional arrangement of the inverter main circuit 1. This circuit has transistors 17, 18, 19 and 20, and feedback diodes 17a, 18a, 19a and 20a. The load 5, and the reactor 2 and capacitor 3 of the A.C. filter are incorporated as illustrated in the figure. Numeral 14 indicates a D.C. supply voltage $V_D$.

Next, the operation of the prior-art circuit will be described.

First, a sinusoidal output voltage 15 corresponding to the control output of the PWM circuit 10 is produced across the terminals of the capacitor 3. Meanwhile, the amplifier 9 and the PWM circuit 10 control the switching of the inverter main circuit 1 so that the output voltage may agree with the sinusoidal wave reference of the A.C. reference voltage generator circuit 8.

Besides, the PWM circuit 10 is constructed of the comparator circuit 10a and the circuit 10b for generating a triangular carrier wave, and it determines the switching point of time of PWM on the basis of a substantially sinusoidal signal from the amplifier 9 as has been obtained by amplifying the deviation of the output voltage. In actuality, the amplifier 9 has only a finite gain from the standpoint of stability. Therefore, the inverter operates in such a manner that the output voltage thereof follows up the reference voltage of the A.C. reference voltage generator circuit 8 with some deviation from the reference voltage.

Waveforms in FIG. 3 represent the ideal values (in a solid line) and actual values (in a broken line) of a potential which is applied to a point a at one end of the load 5, under the assumption that the middle point of the D.C. power source $V_D$ in FIG. 2 is at the ground potential. Further, a sinusoidal wave represents a load current I.

Referring also to FIG. 3, during a period of time 21, the transistors 17 and 20 are "on", and hence, a voltage of $+V_D/2$ is applied to the point a of the load 5. On this occasion, a voltage of $-V_D/2$ is applied to a point b at the other end of the load 5, so that a voltage of $+V_D$ is eventually applied across the load 5. Here, the potentials of the points a and b are actually influenced by the reactor 2 and the capacitor 3. During a period of time 23, the transistors 19 and 18 are "on", and hence, the voltage of $-V_D/2$ is applied to the point a of the load 5. On this occasion, the voltage of $+V_D/2$ is applied to the point b, so that a voltage of $-V_D$ is eventually applied across the load 5.

The solid-line rectangular wave in FIG. 3 is a waveform at the point a in the case where the above two statuses are alternately repeated under the condition of a null transition time.

In actuality, a short-circuit preventive period $T_d$ is set at the transition between the two statuses in order to avoid the overcurrent breakdown of the transistors attributed to the "on" and "off" delays of the individual transistors. (The overcurrent breakdown is elucidated as follows: By way of example, in the course of the transition from the status under which the transistors 17 and 20 are "on" with the transistors 18 and 19 being "off", to the status under which the transistors 17 and 20 are "off" with the transistors 18 and 19 being "on", the turn-off of the transistor 17 or 20 is assumed to be delayed with respect to the turn-on of the transistor 18 or 19. Then, the transistors 17 and 18 or the transistors 19 and 20 are simultaneously turned "on" during the period of the delay, and both the terminals of the D.C. power source 4 are short-circuited in the meantime. Consequently, the transistors 17 and 18, or 19 and 20 lead to the breakdown due to an overcurrent flowing therethrough.) The short-circuit preventive period $T_d$ is so selected that the turn-on of the transistor to change-over from the "off" state to the "on" state is retarded, thereby to prevent the occurrence of the moment at which the transistor 17 or 19 connected to the plus side of the D.C. power source 4 and the transistor 18 or 20 connected to the minus side thereof are both turned "on".

The rectangular wave indicated by the broken line in FIG. 3 is the actual voltage which is applied to the point a in the case of setting the short-circuit preventive period $T_d$.

The transistors 17 and 20 change from the "on" states into the "off" states at the point of time of a transition 22, whereupon the transistors 18 and 19 turn "on" from the "off" states with the delay $T_d$. During the short-circuit preventive period $T_d$, all the transistors are "off", but the load current I continues to flow from the point a to the point b on the basis of the reactor 2 for the filter and the inductance of the load 5. As indicated by an arrow, the path of this load current I extends along the minus side of the D.C. power source 4 → the diode 18a → the load 5 → the diode 19a → the plus side of the D.C. power source 4. As a result, the potential of the point a becomes $-V_D/2$, and that of the point b becomes $+V_D/2$. At the point of time of the transition 22, accordingly, the same voltage waveform as the ideal value is established without the influence of the short-circuit preventive period $T_d$.

The transistors 18 and 19 change from the "on" states into the "off" states in a period of time 24, whereupon the transistors 17 and 20 turn "on" from the "off" states with the delay of the short-circuit preventive period $T_d$. Also during this short-circuit preventive period $T_d$, all the transistors are "off", and the direction of the current is the same as in the foregoing, so that the potential of the point a becomes $-V_D/2$ similarly to the above. The transistors 17 and 20 turn "on" after the short-circuit preventive period $T_d$, so that the potential of the point a becomes $+V_D/2$. As a result, the potential of the point a delays for the short-circuit preventive period $T_d$ relative to the ideal value. Insofar as the load current I is flowing in the same direction as in the foregoing, an error voltage ascribable to this delay has a minus value and develops every cycle of the rectangular wave. The average of such minus values corresponds to the first half of the waveform of a mean error voltage ($V_{TD}$) 26.

Incidentally, in a case where the load current I is flowing in the direction opposite to the foregoing, such an error voltage arises in the period of time in which the transistors 17 and 20 change from the "on" states into the "off" states, followed by the turn-on of the transistors 18 and 19 with the delay of the short-circuit preventive period $T_d$. Insofar as the load current I is flowing in the opposite direction, this error voltage has a plus value and develops every cycle of the rectangular wave. The average of such plus values corresponds to the latter half of the waveform of the mean error voltage $V_{TD}$) 26.

Since the prior-art corrective device for the inverter output voltage error is constructed as described above, all the transistors across both the poles of individual arms are turned "off" for the predetermined short-circuit preventive period ($T_d$) so as to cease the inverter output voltage for the purpose of preventing the arms from short-circuiting during the commutations of the transistors. As a result, the prior-art device has had such a problem that the output voltage involves the error which corresponds to the difference between the actual inverter voltage value indicated by the broken line and the ideal inverter voltage value indicated by the solid line.

SUMMARY OF THE INVENTION

This invention has been made in order to eliminate the problem as mentioned above, and has for its object to provide a corrective device for an inverter output voltage error which can correct the error of an inverter output voltage attributed to a short-circuit preventive period $T_d$.

The corrective device for an inverter output voltage error according to this invention consists in that a current sensor is connected in series with the output of an inverter, that the polarity of a current detected by the current sensor is discriminated by polarity decision means, while a value corresponding to an input D.C. voltage is found by a D.C. voltage sensor, that a signal with the polarity of the value inverted according to the discriminated result delivered from the polarity decision means is generated by a polarity inverter circuit, and that the signal is applied as a correction signal to the PWM (pulse-width modulation) circuit of the inverter so as to correct the output voltage error.

With the corrective device for the inverter output voltage error in this invention, the inverter output current is detected by the current sensor, the correction voltage required for correcting the error of the inverter output voltage is generated on the basis of the voltage level of a D.C. power source and a polarity change command obtained by deciding the polarity of the detected current by means of the polarity decision circuit, and this correction voltage is applied to the PWM circuit of the inverter so as to correct the output voltage error.

BRIEF DESCRIPTION OF THE DRAWINGS

Throughout the drawings, the same symbols indicate identical or equivalent portions.

DESCRIPTION OF THE PREFERRED EMBODIMENTS

Figure 1:
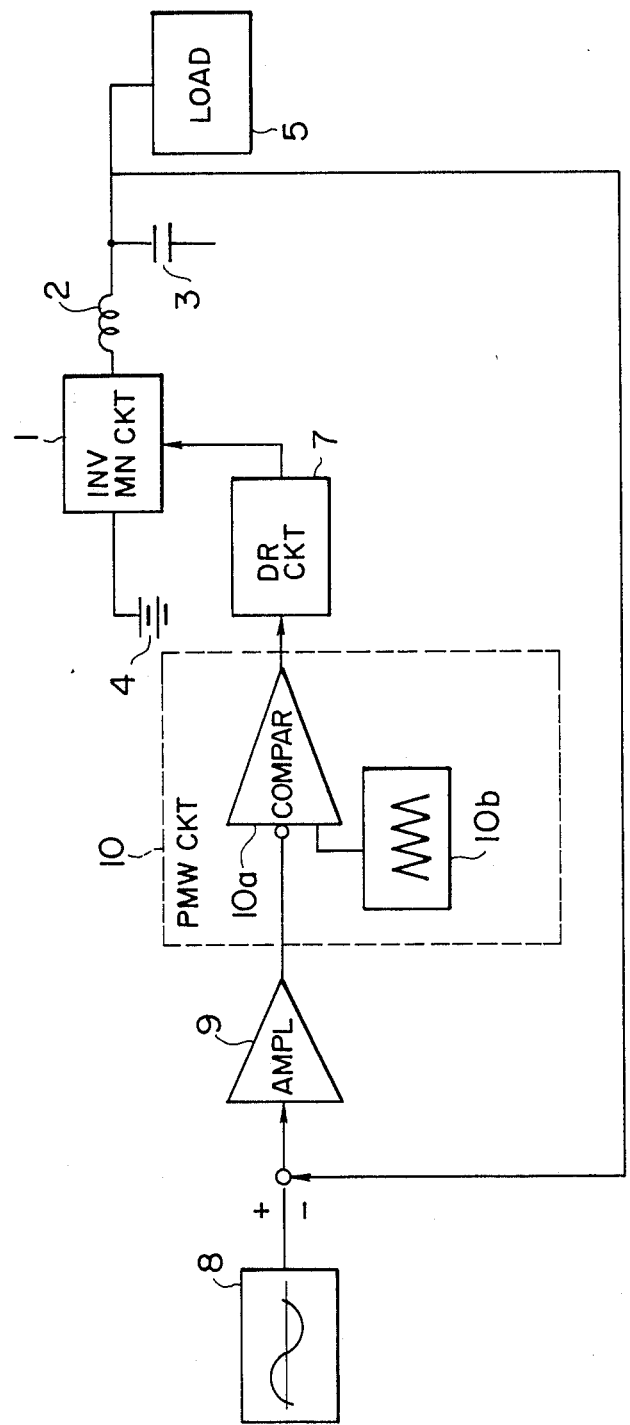
FIG. 1 is a block diagram of a prior-art inverter control circuit.
Figure 4:
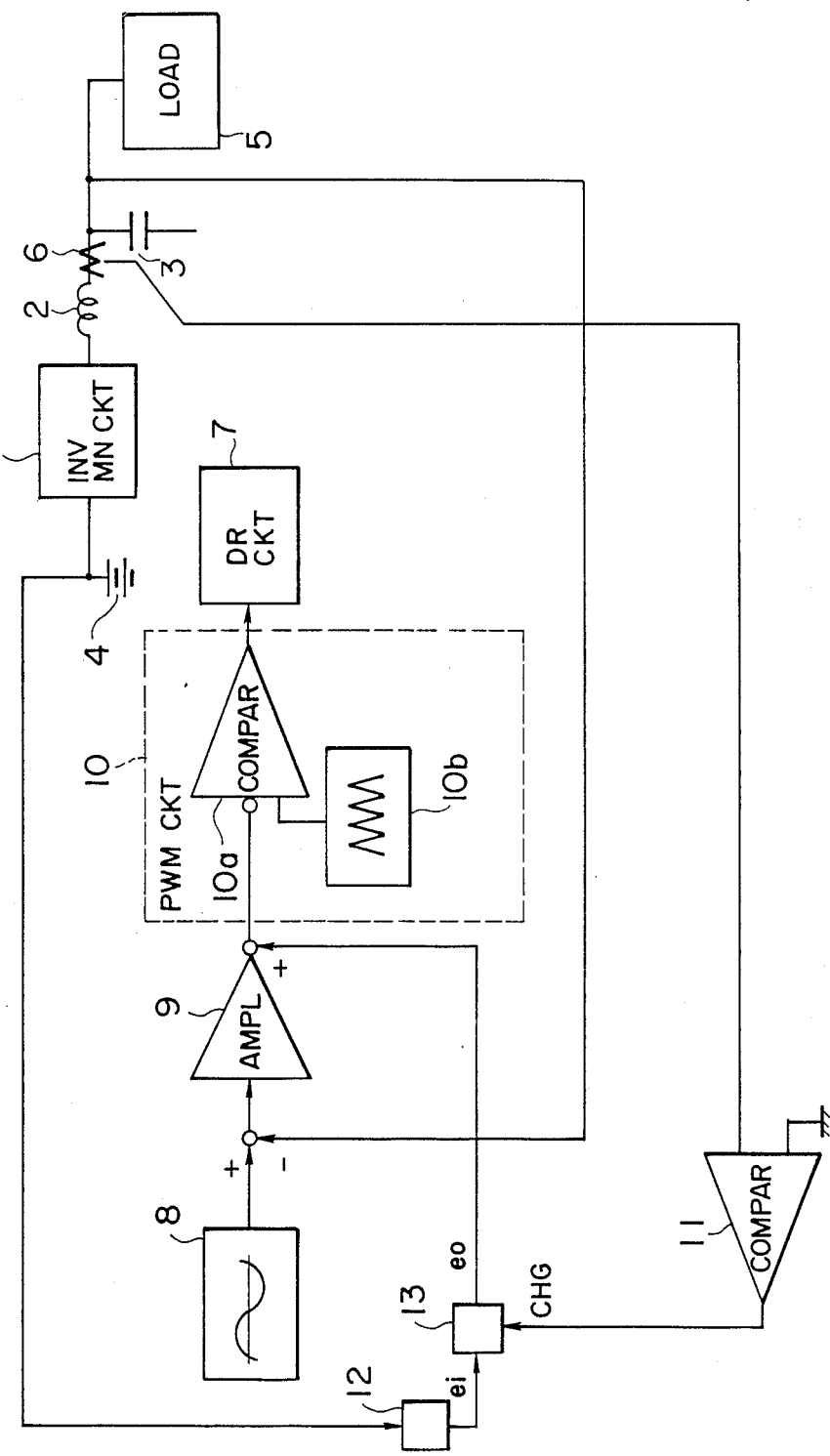
FIG. 4 is a block diagram of an inverter control circuit showing an embodiment of this invention.
Figure 5:
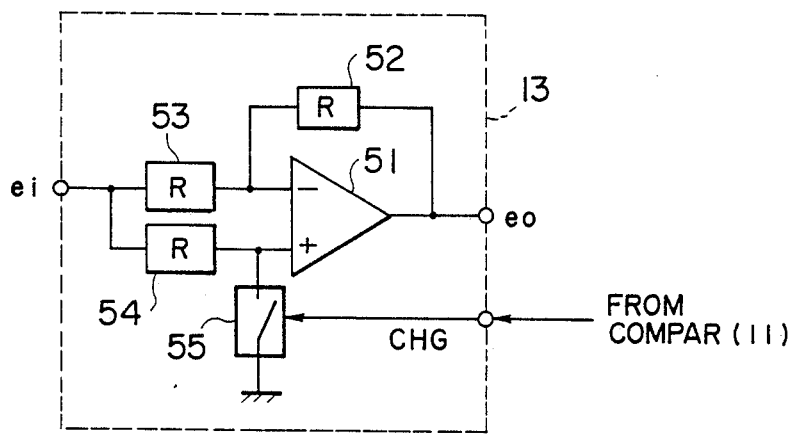
FIG. 5 is a detailed circuit diagram of a polarity inverter circuit shown in FIG. 4.

Now, embodiments of this invention will be described with reference to the drawings. Referring to FIG. 4 in which the same portions as in FIG. 1 are denoted by the same symbols, numeral 6 designates a CT (current transformer) being a current sensor which is connected in series with the output circuit of an inverter, numeral 11 a comparator circuit being polarity decision means for deciding the polarity of an output current detected by the CT 6, numeral 12 a D.C. voltage sensor which detects the voltage level of the D.C. power source 4, and numeral 13 a polarity inverter circuit which inverts the polarity of the output of the D.C. voltage sensor 12 in accordance with the output state of the comparator circuit 11. In addition, FIG. 5 shows an embodiment of the polarity inverter circuit 13, which comprises an operational amplifier 51, fixed resistors 52-54 and an analog switch 55.

Figure 3:
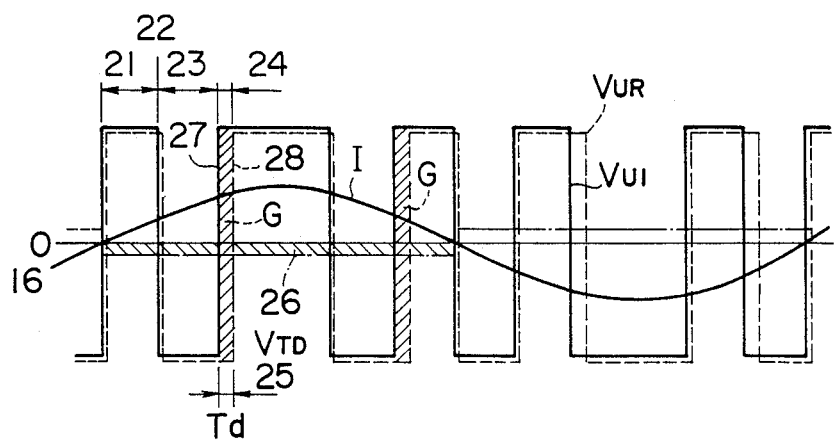
FIG. 3 is a diagram of the waveforms of essential portions for explaining the prior art and this invention.

Next, the operation of the corrective device of this invention will be described. Since the mean error voltage $V_{TD}$ at numeral 26 attributed to the short-circuit preventive period $T_d$ at numeral 25 becomes identical in phase and opposite in polarity to the inverter output current I at numeral 16 as illustrated in FIG. 3, the polarity of the current is discriminated by the comparator circuit 11. The mean error voltage $V_{TD}$ 26 corresponds to the average with respect to time, of the difference between the area of the actual inverter voltage waveform $V_{UR}$ at numeral 28 and that of the ideal inverter voltage waveform $V_{UI}$ at numeral 27, and the following relationship holds:

$$V_{UR} = V_{UI} + V_{TD}$$

where
$V_{UR}$; actual inverter voltage waveform 28,
$V_{UI}$; ideal inverter voltage waveform 27,
$V_{TD}$; mean error voltage.

Figure 2:
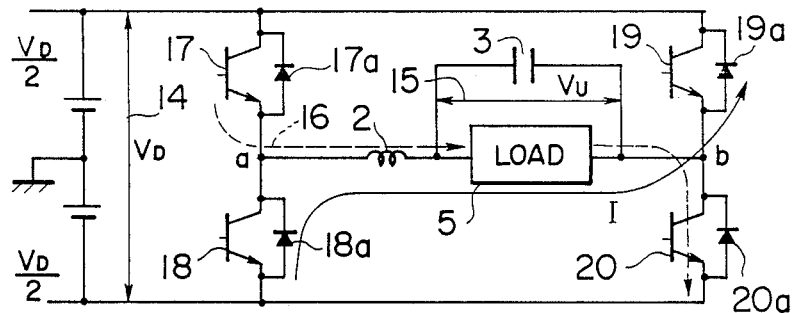
FIG. 2 is a diagram of the conventional arrangement of an inverter main circuit.

In other words, the total area of hatched parts G being the differences between both the waveforms is equal to the area of the hatched part of the mean error voltage $V_{TD}$ 26. In addition, the mean error voltage $V_{TD}$ 26 becomes proportional to the D.C. supply voltage $V_D$ at numeral 14 in FIG. 2. Therefore, when the voltage level of the D.C. power source 4 is detected and then applied to the polarity inverter circuit 13 by the D.C. voltage sensor 12, the detected D.C. input voltage $e_i$ has its polarity inverted according to the output of the comparator circuit 11. Subsequently, as illustrated in FIG. 5, when the polarity inverter circuit 13 is supplied with a polarity change command CHG from the comparator circuit 11, the analog switch 55 turns "on". Thus, the polarity inverter circuit 13 functions as an inverter and produces a D.C. output voltage $e_o = -e_i$. In a case where the polarity change command is not supplied, the analog switch 55 turns "off", and the polarity inverter circuit 13 functions as a noninverting circuit and produces an output voltage $e_o = -e_i$. That is, the polarity inverter circuit 13 delivers the plus polarity when the current polarity being the output signal of the comparator circuit 11 is plus, and it delivers the minus polarity when the current polarity is minus. As a result, the signal which is opposite in polarity to the mean error voltage $V_{TD}$ 26 is obtained at the output of the polarity inverter circuit 13.

Although the embodiments have referred to an example adopting a single-phase circuit as the inverter main circuit 1, a multiphase circuit may well be used. Besides, although an example employing the transistors 17, 18, 19 and 20 as the switching elements has been explained, the same effects as those of the embodiments can be achieved even with different self-extinguishing type elements such as FETs (field-effect transistors) or BIMOS (bipolar transistors/metal-oxide-semiconductor FETs).

As described above, according to this invention, a corrective device for an inverter output voltage error is so constructed that a current sensor is connected in series with the output side of an inverter, that the polarity of a current flowing through the current sensor is discriminated by a comparator circuit, and that a correction signal is applied to the PWM circuit of the inverter via a polarity inverter circuit in accordance with the discriminated polarity of the current and the voltage level of a D.C. power source detected by a D.C. voltage sensor. Therefore, the invention brings forth the effects that the inverter output voltage error is permitted to be automatically corrected, and that an inverter output voltage of high efficiency can be produced.

What is claimed is:

1. In a corrective device for an inverter output voltage error wherein the error of an output voltage of an inverter for changing a D.C. voltage into an A.C. voltage, the error being ascribable to a short-circuit preventive period, is controlled; a corrective device for an inverter output voltage error comprising a current sensor which detects an output current of said inverter, polarity decision means for discriminating a polarity of the inverter output current detected by said current sensor, a D.C. voltage sensor which detects a D.C. voltage of said inverter, and a polarity inverter circuit which receives an output of said polarity decision means and an output of said D.C. voltage sensor and by which a signal with a polarity of the output of said D.C. voltage sensor inverted in accordance with the output state of said polarity decision means is supplied as a correction signal to a PWM (pulse-width modulation) circuit of said inverter.

* * * * *